United States Patent
Holshouser

[19]

[11] Patent Number: 5,960,346
[45] Date of Patent: Sep. 28, 1999

[54] APPARATUS AND METHOD FOR REDUCING MAGNETIC FIELDS IN RADIO TELEPHONES

[75] Inventor: Howard Eugene Holshouser, Efland, N.C.

[73] Assignee: Ericsson, Inc., Research Triangle Park, N.C.

[21] Appl. No.: 08/832,491

[22] Filed: Apr. 3, 1997

[51] Int. Cl.⁶ .................................................. H03G 3/10
[52] U.S. Cl. ......................................... 455/436; 330/285
[58] Field of Search ....................... 455/73, 436; 330/285

[56] References Cited

U.S. PATENT DOCUMENTS 5,126,688  6/1992  Nakanishi et al. ...................... 330/285
5,842,115  11/1998  Dent .......................................... 455/73

FOREIGN PATENT DOCUMENTS 0 405 783 A2  of 1990  European Pat. Off. .
0 405 783 A3  of 1990  European Pat. Off. .
0 674 400 A1  of 1995  European Pat. Off. .
WO 97/27682  of 1997  WIPO .

*Primary Examiner*—William Cumming
*Attorney, Agent, or Firm*—Coats & Bennett, PLLC

[57] ABSTRACT

A novel method and apparatus are described for reducing the effect that magnetic field emissions from a radio telephone may have on devices sensitive to time-varying magnetic fields. The variance of the magnetic field is smoothed by the addition of a smoothing capacitor having a time constant significantly longer than the TDMA time frame which is connected in parallel with the transmitter. In addition, a counter-balancing magnetic field is generated by a field canceling loop connected in series with the transmitter which causes current to flow in a path approximately opposite from the path the current flows through the battery, in roughly parallel plane. The current flowing through the field canceling loop generates a magnetic field approximately coaxial with, and opposite in polarity from, the magnetic field generated by current flowing through the battery, partially negating the latter. Utilization of the method and apparatus result in a reduction in the effective magnitude of the time-varying magnetic field outside the telephone.

17 Claims, 4 Drawing Sheets

5,960,346

APPARATUS AND METHOD FOR REDUCING MAGNETIC FIELDS IN RADIO TELEPHONES

FIELD OF THE INVENTION

The present invention relates generally to the communications field and, in particular, to a method for reducing the effect that magnetic field emissions from a digital radio telephone may have on devices sensitive to time-varying magnetic fields.

BACKGROUND OF THE INVENTION

Digital radio telephones are used throughout the world and are employed in cellular systems such as the European GSM system and the U.S. IS54 system and the Japanese PDC system. Digital cellular telephones intermittently transmit digital signals with a transmitter and receive digital signals with a receiver. The transmitter operates for a short time slot in a repetitive time frame to transmit speech or other data to a base station and alternates with the receiver operating in a different short time slot to receive speech or other data from the base station. Digital cellular telephones are typically battery powered to facilitate mobility.

One problem with digital cellular telephones is that the transmitter consumes higher power from the battery than the receiver. This causes the current drawn from the battery to be cyclic at the frame repetition rate. This cyclic current gives rise to time-varying magnetic field that may cause magnetic coupling with nearby devices. This magnetic coupling may degrade or otherwise interfere with the optimal operation of devices sensitive to time-varying magnetic fields.

One example of a device that is sensitive to time-varying magnetic fields is a hearing aid equipped with a "tele-coil." A "tele-coil" is an inductive device that is placed near a telephone speaker and used to couple audio signals from the speaker to a hearing aid. In simple terms, the tele-coil includes a pick-up coil that is placed into the magnetic field of the speaker. As the speaker is induced to create audio signals by electrical signals sent to its electromagnet, the corresponding magnetic field is coupled to the pick-up coil. This magnetic field is amplified and sent to the hearing aid's speaker or transducer. Thus, a tele-coil facilitates the use of telephones by people who have hearing problems.

Unfortunately, the magnetic coupling that occurs between a digital cellular telephone and the tele-coils of certain hearing aids may generate noise or hum in the hearing aid, making use of the telephone less than optimal for hearing aid users. The noise or hum is at least partially caused by the time-varying magnetic field generated by the varying current levels in the battery-transmitter electrical circuit. This problem of hum is particularly exacerbated when the on/off cycle time of the transmitter is in the audio frequency range.

Thus, there is a need for reducing the effect that magnetic field emissions from a radio telephone may have on devices sensitive to time-varying magnetic fields. One approach is to reduce the strength of the generated magnetic fields by significantly reducing the current flowing through the telephone. However, this has proved impractical based on the power levels required for adequate transmission of signals.

SUMMARY

The present invention is a method and apparatus employing a novel approach for reducing the effect that magnetic field emissions from a digital radio telephone may have on devices sensitive to time-varying magnetic fields. Instead of reducing the intrinsic magnetic field produced by current flowing through the battery-transmitter circuit, the variance of the magnetic field is smoothed by the addition of a smoothing capacitor and a counter-balancing magnetic field is generated by a field canceling loop in close proximity with the battery. The smoothing capacitor, with a time constant significantly longer than the TDMA time frame, is connected in parallel with the transmitter. The field canceling loop is connected in series with the transmitter and causes current to flow in a path approximately opposite from the path the current flows through the battery, but in roughly parallel plane. The current flowing through the field canceling loop generates a magnetic field approximately coaxial with, and opposite in polarity from, the magnetic field generated by current flowing through the battery. Thus, the field canceling loop magnetic field at least partially negates the battery magnetic field, with a resulting reduction in the effective magnitude of the time-varying magnetic field outside the telephone.

DETAILED DESCRIPTION OF THE PREFERRED EMBODIMENTS

Figure 1:
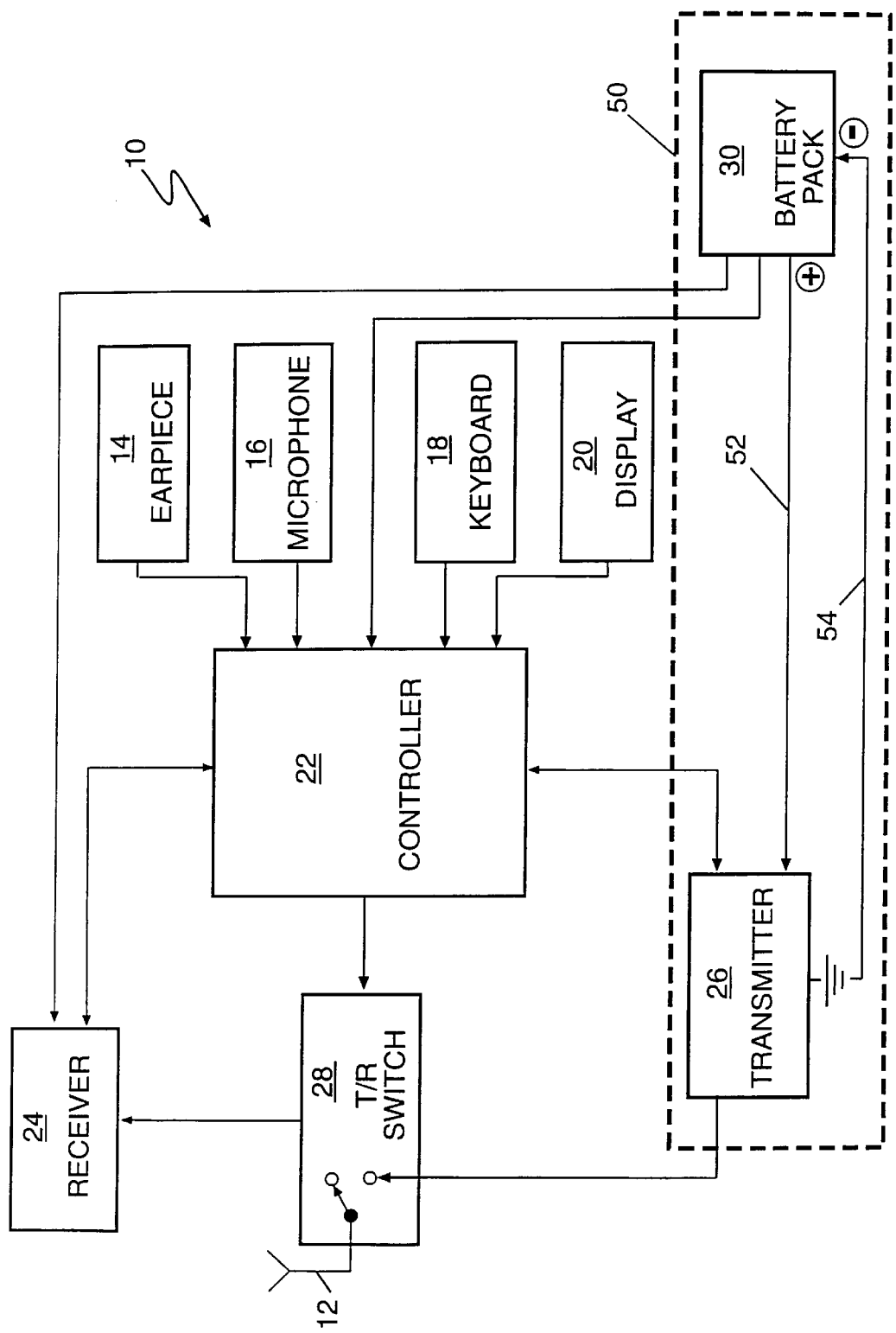
FIG. 1 is a simplified block diagram of typical digital cellular telephone.

Referring to the drawings, a simplified block diagram of a typical digital cellular telephone 10 is shown in FIG. 1. In the preferred embodiment the cellular telephone 10 is of a type which operates in a TDMA cellular system such as the European GSM system, the U.S. IS54 system, and/or the Japanese PDC system. The digital cellular telephone 10 is a time-duplex telephone that receives signals from a base station and transmits signals to the base station during the different time slots in a conventional manner.

As shown in FIG. 1 a digital cellular telephone 10 generally includes an antenna 12, an earpiece 14, a microphone 16, a keyboard 18, a display 20, controller 22, a receiver 24, a transmitter, a transmit/receive switch 28, and battery pack 30. The organization and operation of these components are well known in the art and are not important to understand the present invention.

Figure 2:
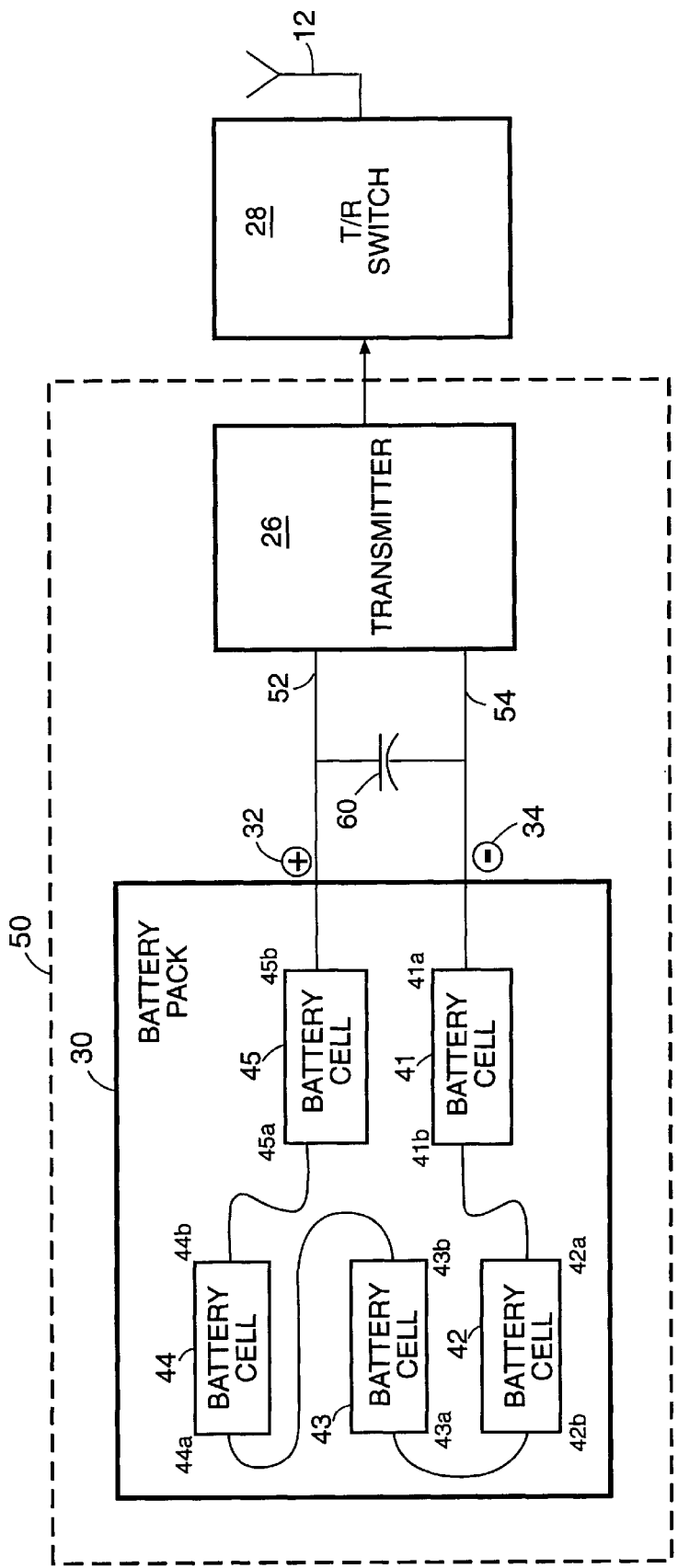
FIG. 2 is a simplified block diagram of the main power flow for transmission

It is common for digital telephone battery packs 30 to be composed a plurality of individual battery cells (see FIG. 2) arranged in electrical series. For simplicity, five cells 41,42, 43,44,45 are shown in FIG. 2, but any number may be used in practice. The battery pack 30 has both a negative terminal 34 and a positive terminal 32. In addition, each battery cell has a negative terminal 41*a*, 42*a*, 43*a*, 44*a* 45*a* and a positive terminal 41*b*, 42*b*, 43*b*, 44*b*, 45*b*. In practice, the positive terminal of one cell is electrically connected to the negative terminal in the next cell. Thus, the current path through the five cell battery pack 30 of FIG. 2 is from the battery pack negative terminal 34 to the negative terminal of the first battery cell 41*a*, through the first battery cell 41, to the positive terminal of the first battery cell 41*b*, to the negative terminal of the second battery cell 42*a*, through the second battery cell 42, to the positive terminal of the second battery cell 42b, to the negative terminal of the third cell 43a, and so forth until the positive terminal of the last battery cell 45b, and then to the positive terminal of the battery pack 32.

In many cellular telephones, the battery pack 30 occupies a significant portion of the overall physical size of the cellular telephone 10. Likewise, the circuit path through the battery pack 30 is a significant portion of the overall physical size of the cellular telephone 10.

For clarity, the transmitter power circuit is isolated and shown in FIG. 2. The transmitter power circuit 50 includes the battery pack 30 and the transmitter 26 interconnected by a positive circuit path 52 and negative circuit path 54. During transmission, electrical current flows from the battery pack 30 to the transmitter 26 via the positive circuit path 52 and returns via negative path 54. Thus, an electrical circuit loop is created between the battery pack 30, positive circuit path 52, the transmitter, 26 and negative path 54.

When electric current flows through an electrical circuit in the form of a loop, a magnetic field is generated. The magnetic field is in a direction normal to the loop with a polarity that is determined by the direction of current flow and application of the right-hand-rule. Thus, the same circuit loop can generate one of two magnetic fields depending on the direction that current is flowing through the loop. In addition, two identical circuits that are axially aligned and disposed in a physically parallel orientation, such as when one overlays another, can cancel each others' magnetic fields when current is made to flow in opposite directions in the two circuits.

When the electric current flowing through a circuit is varied at a given frequency, the corresponding magnetic field will likewise vary. When the electric current is composed of several frequencies, these frequencies will be represented in the magnetic field. Thus, an electric current having a current profile with many harmonics will produce a complex magnetic field having many harmonics.

Figure 3:
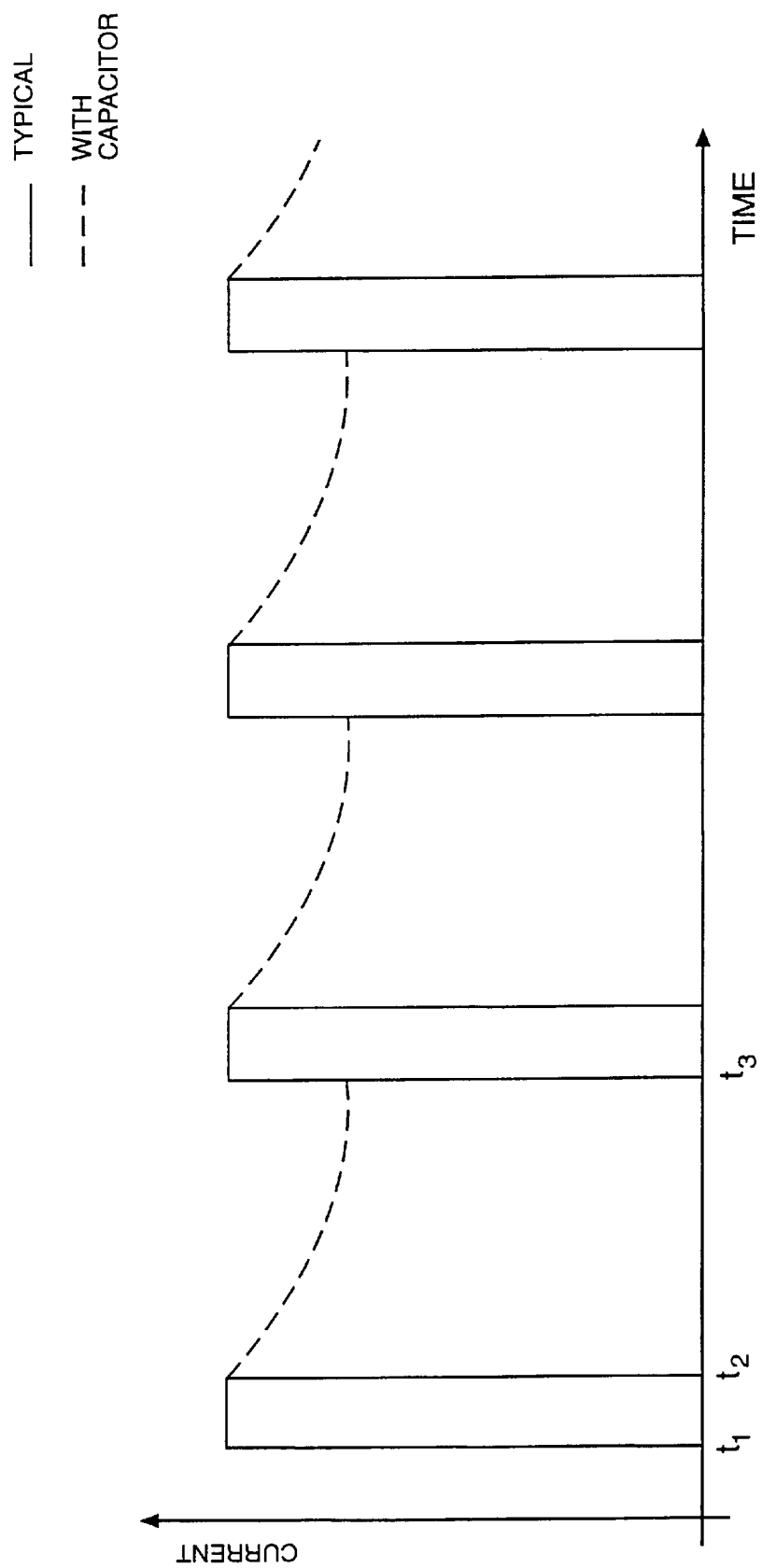
FIG. 3 is a graphical representation of the current level in the transmission power circuit over time.

For digital cellular telephones, relatively high current levels flow through the transmitter power circuit 50 during transmission, but very low current levels (sometimes zero) flow through the same circuit 50 during reception. The time-varying nature of the current level of a typical transmitter power circuit 50 is shown in FIG. 3. During transmission mode, the period from $t_1$ to $t_2$, the current level is high. In receive, or non-transmission mode, from $t_2$ to $t_3$, the current level is very low or zero. As can be seen, the overall current level profile in the transmitter power circuit 50 has the characteristics of a square wave. Translating this into the language of frequencies, the square wave shape implies the presence of numerous harmonics in the current level. Thus, the sharp on/off profile of the electrical current in the transmitter power circuit 50 tends to produce a complex magnetic field having many harmonics.

According to the method of the present invention, the impact of the generated magnetic fields on devices sensitive to time-varying magnetic fields may be lessened by including a capacitor 60 in the transmitter power circuit 50, parallel to the transmitter 26. FIG. 2 shows a capacitor 60 connected to the transmitter power circuit between the battery pack 30 and the transmitter 26. The effect of this capacitor 60 is to divide the power circuit into two portions and smooth the sharp on/off characteristics of the current level profile for at least a portion of the transmitter power circuit 50. The current level experienced by the portion of the transmitter power circuit 50 which includes the battery pack 30 and the capacitor 60 is shown in FIG. 3 by a dotted line. The current level of the other portion of the circuit 50 is shown by the solid line. As is clearly illustrated, at least a portion of the sharp on/off profile is smoothed by the inclusion of the capacitor 60. This smoothing helps diminish the generation of significant harmonics within the magnetic field. Preferably, the capacitor 60 used has a rating such that the time constant of the smoothed circuit is longer than the TDMA time slotting period. Thus, the current level will fall only partway before the next transmit time slot.

Figure 4:
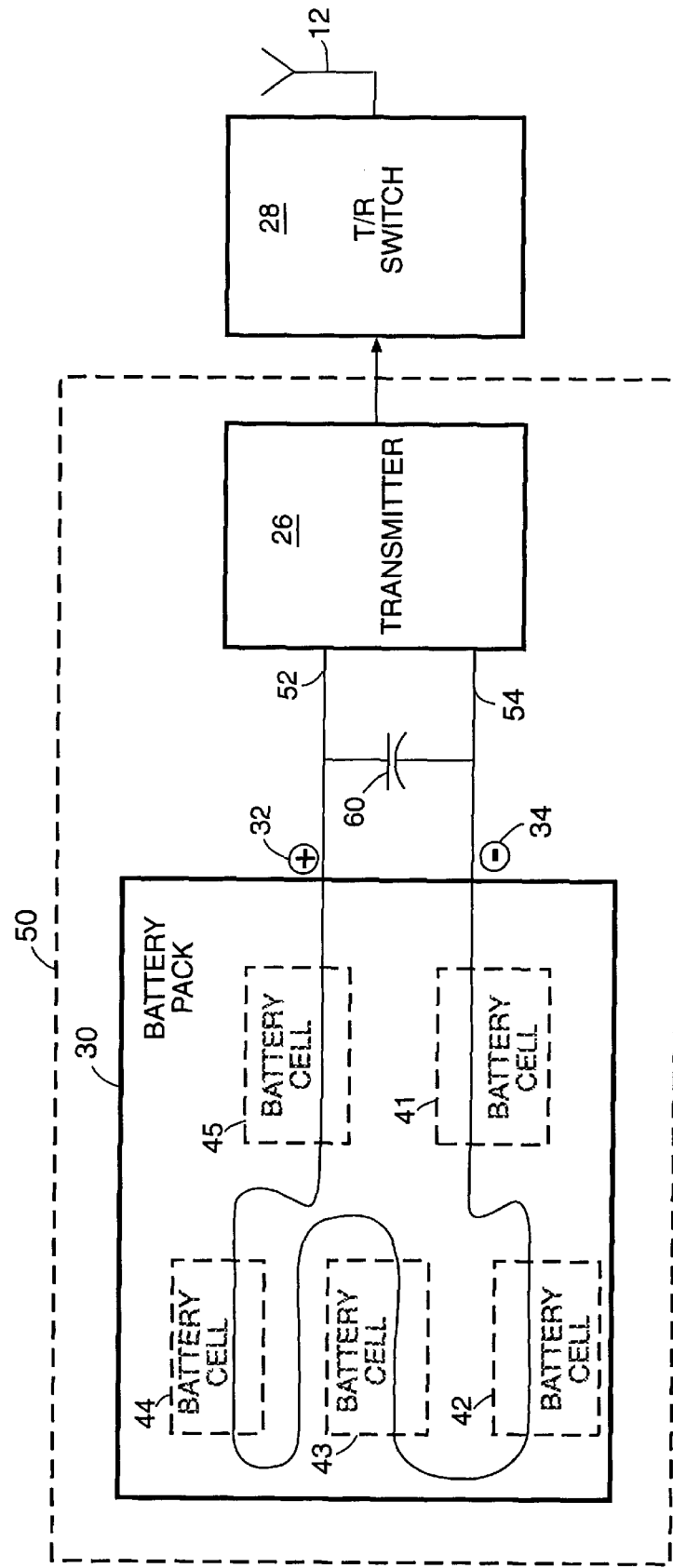
FIG. 4 is the block diagram of FIG. 2 with the addition of a field canceling loop.
Figure 4:
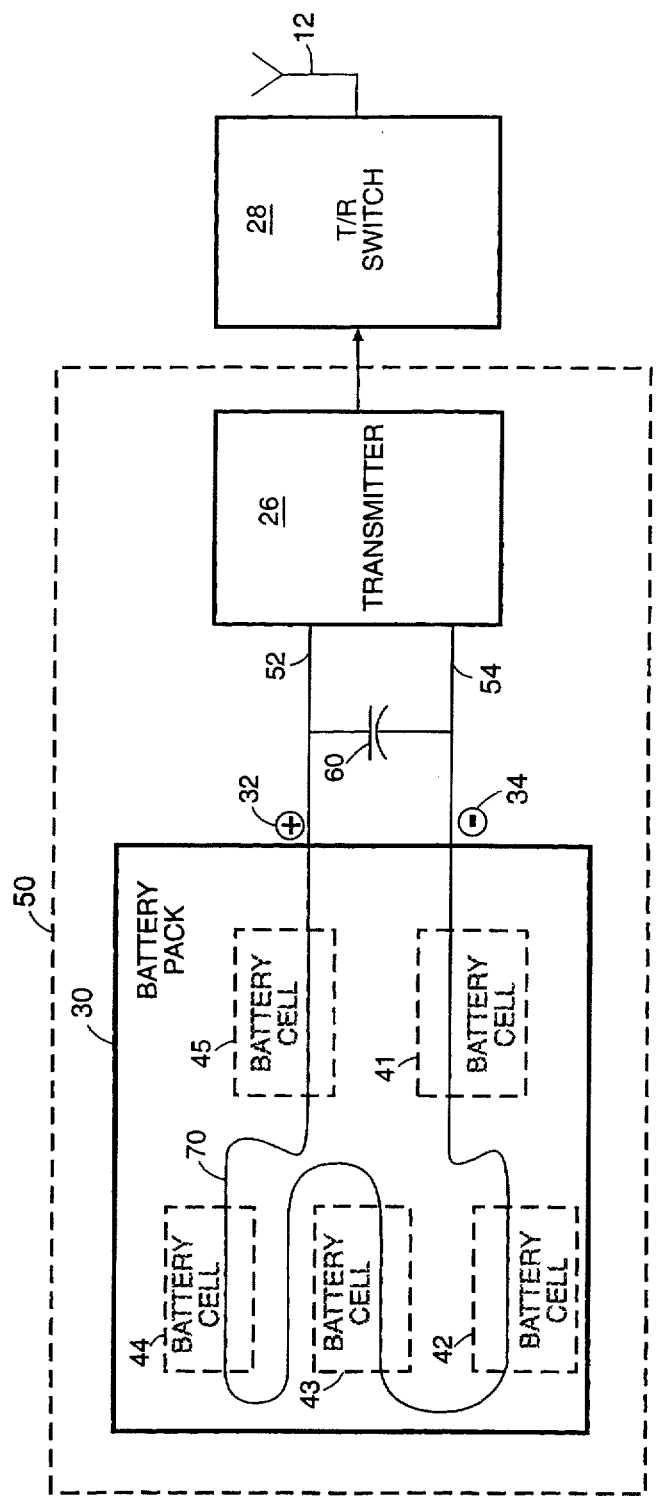

Another approach of the present invention to reducing the impact on devices sensitive to time-varying magnetic fields is to utilize a field-canceling loop 70 over the battery pack 30. FIG. 4 shows a preferred embodiment of this approach. In this approach a field canceling loop 70 is inserted in the electrical path between the positive terminal 45b of the final battery cell 45 and the positive terminal of the battery pack 32. This field canceling loop 70 follows a physical path that is the reverse of the current path through the battery cells of the battery pack 30. Obviously this field-canceling loop 70 does not travel through the battery cells 41,42,43,44,45. Instead, in the preferred embodiment, the field-canceling loop 70 is included on a flexible sheet which overlays the battery cells 41,42,43,44,45 of the battery pack 30 such that the field-canceling loop is coaxial with the current path through the battery cells. While it is preferred that this field-canceling loop be internal to any protective shell of the battery pack, the particular details of the mechanical packaging are not important to understanding the present invention.

The inclusion of this field-canceling loop 70 in a plane parallel to the battery cells 41,42,43,44,45 causes the magnetic field generated by current flowing through the individual battery cells to be wholly or partially negated by the magnetic field generated by the same current flowing through the field-canceling loop 70. Because the magnetic field generated by the field-canceling loop 70 is opposite polarity to that generated by current flowing through the battery cells 41,42,43,44,45, the two fields ideally cancel each other out. In practice, the cancellation is not perfect due to numerous variations, but an approximately 10 dB reduction has been realized in field intensity.

A preferred embodiment of the present invention includes both the field-canceling loop 70 and the smoothing capacitor 60. One example of this embodiment has been manufactured using five 1.5 v battery cells in series, a 1000 $\mu$F smoothing capacitor 60, and a field canceling loop 70 of a single run in the shape shown in FIG. 4 on a thin, flexible plastic sheet internal to the battery pack casing.

Based on the foregoing, it is apparent that the present invention provides a method for reducing the magnetic fields of digital cellular telephones. This method is particularly useful in decreasing the negative effects the operation of such telephones may have on nearby devices that are sensitive to time-varying magnetic fields, such as hearing aids.

The foregoing description focuses on the present invention as applied to digital cellular telephones and their impact on hearing aids. It is to be understood however, that the present invention is applicable to a wide variety of radio telephones and their impact on other devices sensitive to time-varying magnetic fields, and such applications are within the scope of the present invention.

The present invention may, of course, be carried out in other specific ways than those herein set forth without departing from the spirit and the essential characteristics of the invention. The present embodiments are therefore to be considered in all respects as illustrative and not restrictive and all changes coming within the meaning and equivalency range of the appended claims are intended to be embraced therein.

What is claimed is:

1. A method for modifying magnetic field emissions of a radio telephone, said radio telephone including a transmitter power circuit, said transmitter power circuit including a battery having a positive terminal and a negative terminal and a transmitter connected to said battery, comprising the step of directly electrically connecting a smoothing capacitor between said negative terminal and said positive terminal of said battery and in parallel with said transmitter so as to reduce the harmonics generated by the portion of said transmitter power circuit including said battery but not including said transmitter.

2. The method of claim 1 wherein said radio telephone transmits during a time slot in a TDMA time frame and said capacitor has a time constant significantly greater than said TDMA time frame.

3. A method for modifying magnetic field emissions of a radio telephone, said radio telephone including a battery having a positive terminal and a negative terminal, comprising the step of generating a magnetic field approximately coaxial with, and opposite in polarity from, the time-varying magnetic field generated by current flowing through said battery so as to at least partially cancel the magnetic field generated by said battery current.

4. The method of claim 3 wherein said generation step includes causing current to flow in a path approximately opposite from the path said current flows through said battery, but in a different plane.

5. The method of claim 3 wherein said battery includes a plurality of battery cells arranged in series and wherein current flowing through said battery flows through said battery cells.

6. The method of claim 3 wherein said radio telephone includes a transmitter connected to said battery and further comprising the step of electrically connecting a smoothing capacitor between said negative terminal and said positive terminal and in parallel with said transmitter.

7. The method of claim 6 wherein said radio telephone transmits during a time slot in a TDMA time frame and said capacitor has a time constant significantly greater than said TDMA time frame.

8. The method of claim 3 further including operating said radio telephone in a time-duplex fashion.

9. A method for modifying magnetic fields emitted from a radio telephone including a transmitter and a battery having a positive terminal and a negative terminal comprising the steps of:

a) forming a field cancellation loop in a plane generally parallel to and at least partially overlying said battery; and b) electrically connecting said field cancellation loop in series with said positive terminal and said transmitter so that the electrical current flows through said field cancellation loop in a direction opposite to the current flow through said battery when the transmitter is activated.

10. The method according to claim 9 wherein said current path in said field cancellation loop mirrors the current path in said battery, in an opposite direction.

11. A method for modifying magnetic field emissions of a digital cellular telephone, said cellular telephone including a transmitter and a battery having a positive terminal and a negative terminal, comprising the steps of:

a) generating a magnetic field approximately coaxial with, and opposite in polarity from, the time-varying magnetic field generated by current flowing through said battery; wherein said generating includes causing current to flow in a path approximately opposite from the path said current flows through said battery, but in a parallel plane;

b) electrically connecting said transmitter to said battery;

c) directly electrically connecting a smoothing capacitor between said negative terminal and said positive terminal and in parallel with said transmitter; and d) wherein said telephone transmits during a time slot in a TDMA time frame and said capacitor has a time constant significantly greater than said TDMA time frame and wherein said battery includes a plurality of battery cells.

12. A radio telephone comprising:

a) a battery;

b) a transmitter electrically connected to said battery via a positive current path and a negative current path; and c) a smoothing capacitor directly electrically connected to said positive current path and said negative current path and in parallel with and said transmitter.

13. The device of claim 12 wherein said radio telephone transmits in a time slot in a TDMA time frame and said capacitor has a time constant significantly larger than said TDMA time frame.

14. The device of claim 12 wherein said battery includes a plurality of battery cells.

15. A radio telephone comprising:

a) a battery;

b) a transmitter operating in a time-duplex fashion and electrically connected to said battery via a positive current path and a negative current path; and c) a field cancellation loop electrically connected in series between said battery and said positive current path and disposed so as to generate a magnetic field approximately coaxial with, and opposite in polarity from, the time-varying magnetic field generated by current flowing through said battery.

16. The device of claim 15 further comprising a smoothing capacitor electrically connected to said positive current path and said negative current path and in parallel with said transmitter.

17. A radio telephone for operation in a TDMA time frame environment comprising:

a) a battery;

b) a transmitter operating in a time-duplex fashion and drawing power from said battery via a positive current path and a negative current path;

c) a field cancellation loop electrically connected in series between said battery and said positive current path; and d) a smoothing capacitor directly electrically connected to said positive current path and said negative current path and in parallel with and said transmitter, wherein said capacitor has a time constant significantly longer than said TDMA time frame.

* * * * *

UNITED STATES PATENT AND TRADEMARK OFFICE
CERTIFICATE OF CORRECTION

PATENT NO : 5,960,346
DATED : September 28, 1999
INVENTOR(S): Howard Eugene Holshouser It is certified that error appears in the above-identified patent and that said Letters Patent is hereby corrected as shown below:

In the drawings, substitute Fig. 4 with the figure shown on the attached page.

Signed and Sealed this

Eleventh Day of April, 2000

*Attest:*

Q. TODD DICKINSON

*Attesting Officer*      *Director of Patents and Trademarks*